May 13, 1924.                J. PASCHE-HUGUENIN                1,494,066
                    SILENCING JOINT FOR DOMESTIC WATER CONDUITS
                              Filed Nov. 24, 1920
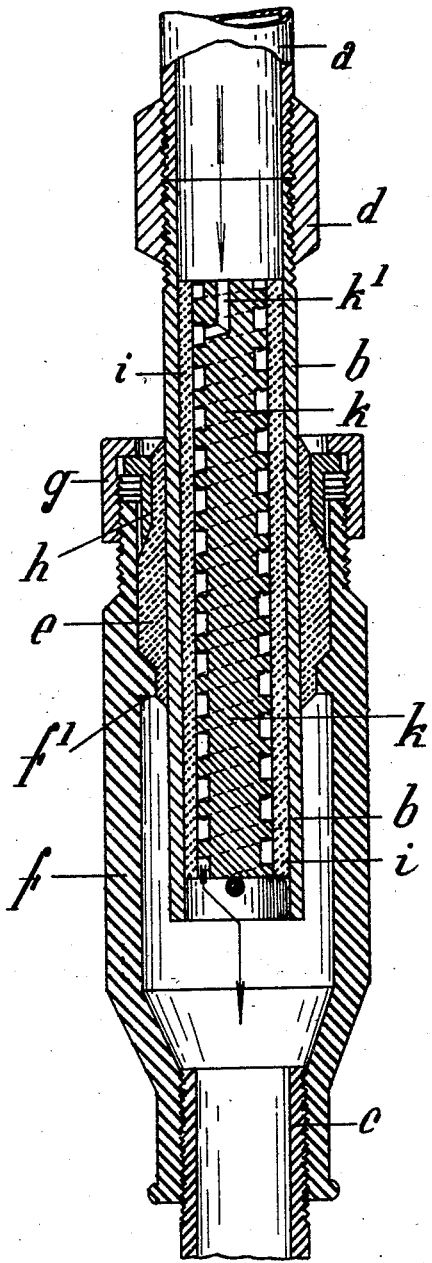
Inventor:
Jules Pasche-Huguenin
By Lawrence Langner
    Attorney Patented May 13, 1924.

1,494,066

UNITED STATES PATENT OFFICE.

JULES PASCHE-HUGUENIN, OF LAUSANNE, SWITZERLAND.

SILENCING JOINT FOR DOMESTIC WATER CONDUITS.

Application filed November 24, 1920. Serial No. 426,256.

*To all whom it may concern:*

Be it known that I, JULES PASCHE-HUGUENIN, a citizen of Switzerland, residing at Lausanne, canton of Vaud, in the Confederation of Switzerland, have invented certain new and useful Improvements in Silencing Joints for Domestic Water Conduits, of which the following is a specification.

The object of my invention is a joint for use in domestic water conduits or pipes that does away with the propagation of sounds in the pipings which is adapted to connect two end pieces of metal pipes in a perfectly tight manner and at the same time avoids the gargling sound resulting in the pipes when air bubbles are carried along by the flowing water.

The drawing shows by way of example a working form of the invention.

$a$ and $c$ are the ends of two pipes which are to be connected together by a silencing joint according to the invention.

For this purpose an intermediate tube or pipe $b$ is fixed at the extremity of pipe $a$ by means of an interiorly threaded sleeve $d$. The intermediate pipe $b$ is entered into a rubber joint or sleeve $e$ which is connected in such a manner to the inner shoulder $f^1$ of the junction box $f$ that it acts as a kind of a dashpot for the longitudinal and the lateral or radial vibrations which may be caused for instance by a shock from outside or by a water-hammer in the piping. The rubber joint $e$ is maintained in its place and pressed against the shoulder $f^1$ by a threaded member $g$ and ring $h$ constituting a stuffing box.

Into the pipe $b$ is fitted a rubber hose $i$ containing a screw $k$ provided with entrance aperture $k^1$. This arrangement forces the water arriving by pipe $a$ to pass through the entrance aperture $k^1$ and to flow in the path between the threads of screw $k$ which is tightly pressed against the wall of rubber hose $i$ but without penetrating into the rubber. The flow of the water thus regulated and directed takes place without causing any noise which often is produced in ordinary joints by the air bubbles which have accumulated along an expansion of such junctions.

Of course the invention may be contained in many forms of the silencing joint, all of which come within the purview of my claims hereafter described. For instance instead of using an intermediate tube $b$ one might fit the inner and the outer elastic sleeve right in and onto one of the ends of one of the pipes which are to be joined, and instead of a screw, as shown in the drawing the flow of water might be directed and guided by some other member inserted into the inner elastic sleeve.

Having now described my invention and the manner in which it may be performed, what I claim is:

1. In a silencing joint for domestic water conduits adapted to prevent the propagation of sounds arising in said conduits, a hose or sleeve of elastic material adapted to be inserted into one end of one of the pipes to be connected, said sleeve containing a contracted passage for the flow of the water, an elastic outer sleeve adapted to be mounted upon said end, a junction box adapted to be screwed onto an end of the other pipe to be connected, and means to press said elastic outer sleeve both closely upon the circumference of the first mentioned pipe and against the inner wall of the junction box, substantially as described.

2. In a silencing joint for domestic water conduits adapted to prevent the propagation of sounds arising in said conduits, an intermediate connecting tube, a hose or sleeve of elastic material inserted into said connecting tube, said sleeve containing a contracted passage for the flow of the water, an elastic outer sleeve mounted upon said intermediate tube, a junction box adapted to be screwed onto an end of one of the pipes to be connected, and means to press said elastic outer sleeve both closely upon the circumference of said tube and against the inner wall of the junction box, an interiorly threaded sleeve for connecting the intermediate tube after its being fitted with the inner and outer sleeve of elastic material to an end of the other pipe to be connected, substantially as described.

3. In a silencing joint for domestic water conduits adapted to prevent the propagation of sounds arising in said conduits, a hose or sleeve of elastic material adapted to be inserted into an end of one of the pipes to be connected, said sleeve containing a contracted passage for the flow of the water, an elastic outer sleeve adapted to be mounted upon said end, a junction box adapted to be screwed onto an end of the other pipe to be connected, shoulders in the inner wall of said junction box, and means to press said elastic outer sleeve tightly upon the circumference of the first mentioned pipe and also against the inner wall of the junction box, and particularly onto the shoulders provided in it, substantially as described.

4. In a silencing joint for domestic water conduits adapted to prevent the propagation of sounds arising in said conduits, a hose or sleeve of elastic material adapted to be inserted into an end of one of the pipes to be connected, a member inserted into said sleeve, to form a tortuous passage for the flow of the liquid, an elastic outer sleeve adapted to be mounted upon said end, a junction box adapted to be screwed onto an end of the other pipe to be connected, and a stuffing box to secure said outer sleeve in assembled relation, substantially as described.

5. In a silencing joint for domestic water conduits adapted to prevent the propagation of sounds arising in said conduits, an intermediate connecting tube, a hose or sleeve of elastic material inserted into said connecting tube, said sleeve containing a contracted passage for the flow of the water, an elastic outer sleeve mounted upon said intermediate tube, an interiorly threaded sleeve for connecting the intermediate tube after its being fitted with the inner and outer sleeves of elastic material to an end of one of the pipes to be connected, a junction box adapted to be screwed onto an end of the other pipe to be connected, shoulders in the inner walls of said junction box and means to press said outer sleeve tightly upon the circumference of the tube and also against the inner wall of the junction box, and particularly onto the shoulders provided in it, substantially as described.

6. In a silencing joint for domestic water conduits adapted to prevent the propagation of sounds arising in said conduits, an intermediate connecting tube, a hose or sleeve of elastic material inserted into said connecting tube, a member inserted into said sleeve, to form a tortuous passage for the flow of the liquid, an elastic outer sleeve mounted upon said intermediate tube, an interiorly threaded sleeve for connecting the intermediate tube after its being fitted with the inner and outer sleeve of elastic material to an end of one of the pipes to be connected, a junction box engaging said outer sleeve adapted to be screwed on an end of the other pipe to be connected, and a stuffing box to secure said outer sleeve is assembled relation, substantially as described.

In testimony whereof I affix my signature in presence of two witnesses.

JULES PASCHE-HUGUENIN.

Witnesses:
ARMIN WEBER,
AUG. NAMIN.